United States Patent [19]

Hull

[11] 4,154,413
[45] May 15, 1979

[54] CLOSED FACE SPINNING REEL

[76] Inventor: R. Dell Hull, 6101 E. Apache St., Tulsa, Okla. 74101

[21] Appl. No.: 815,169

[22] Filed: Jul. 13, 1977

Related U.S. Application Data

[60] Division of Ser. No. 651,412, Jan. 22, 1976, Pat. No. 4,017,927, which is a continuation of Ser. No. 411,682, Nov. 1, 1973, abandoned, which is a division of Ser. No. 219,038, Jan. 19, 1972, Pat. No. 3,794,264.

[51] Int. Cl.² .............................................. A01K 89/01
[52] U.S. Cl. .................................. 242/84.2 A; 242/217
[58] Field of Search .................... 242/84.2 A, 84.2 R, 242/84.2 F, 84.21 R, 84.21 A, 217; 403/157, 165, 119, D10

[56] References Cited

U.S. PATENT DOCUMENTS

| | | | |
|---|---|---|---|
| 2,973,540 | 3/1961 | Saenz | 403/119 X |
| 3,224,703 | 12/1965 | Clark | 242/84.21 A |
| 3,284,018 | 11/1966 | Wood | 242/84.2 A |
| 3,481,554 | 12/1969 | Hull | 242/84.2 A |
| 3,836,092 | 9/1974 | Hull | 242/84.2 A |
| 3,932,954 | 1/1976 | Wyroski | 242/84.2 A |

*Primary Examiner*—Billy S. Taylor
*Attorney, Agent, or Firm*—Mandeville and Schweitzer

[57] ABSTRACT

The disclosure herein relates to fishing reels, especially so-called closed face spinning reels, and it is directed more specifically to certain structural arrangements in closed face spinning reels, including a new pickup head casting lock; a new bayonet-type line spool mount; a simplifed housing structure; a simplified anti-reverse mechanism; and a simplified drag brake mechanism. These new structural arrangements for spinning reels tend to improve the operation thereof, to accommodate the use of inexpensive new plastic materials of construction, to simplify the manufacture of the components, and to simplify the assembly thereof in the mass production of closed face spinning reels.

3 Claims, 10 Drawing Figures

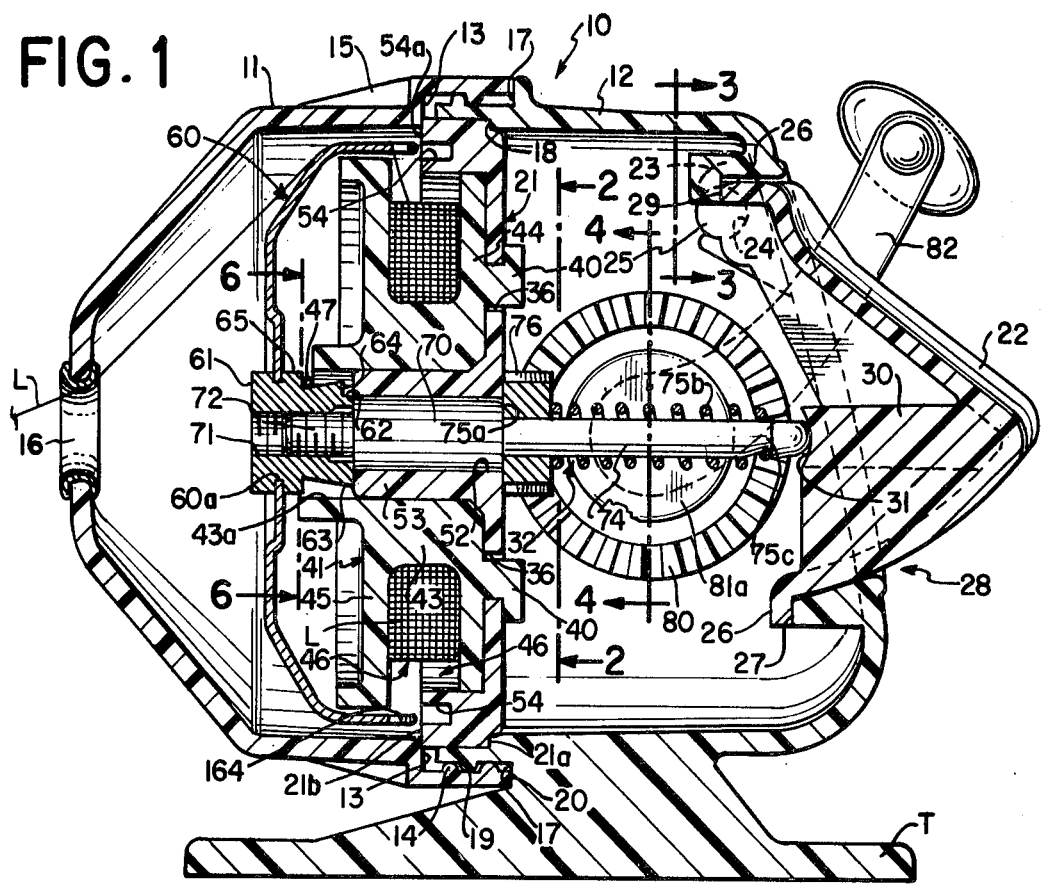

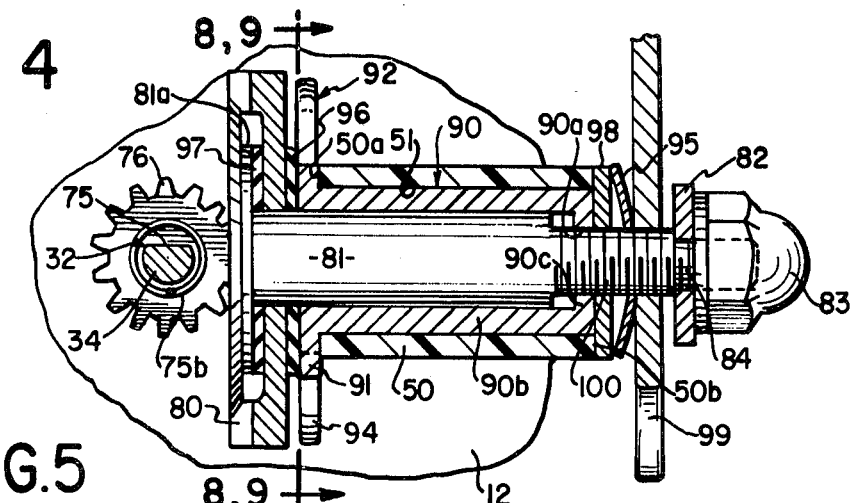
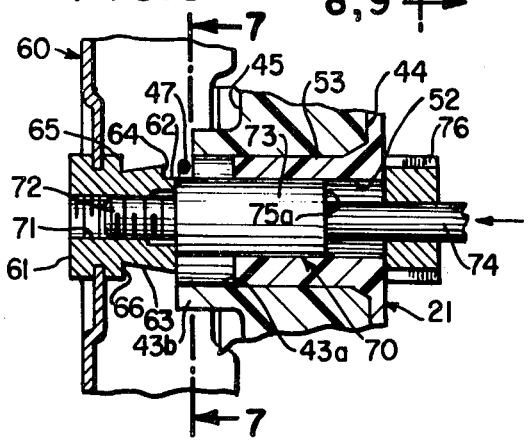
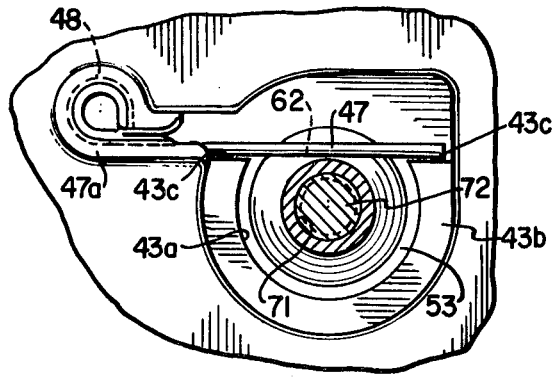
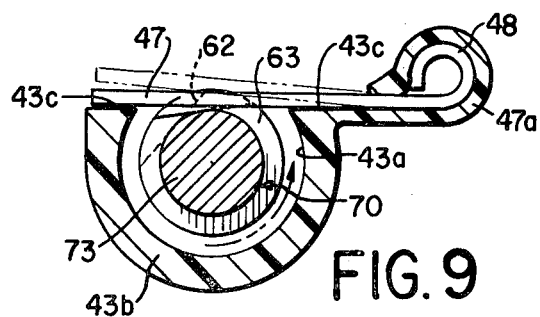
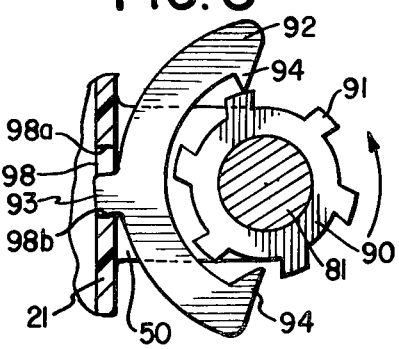
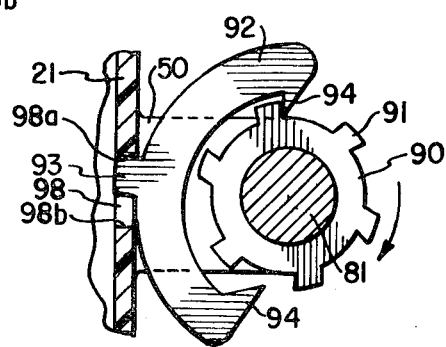

CLOSED FACE SPINNING REEL

This is a division of application Ser. No. 651,412, filed Jan. 22, 1976, now U.S. Pat. No. 4,017,927, in turn a continuation of Ser. No. 411,682 filed Nov. 1, 1973, now abandoned; in turn a division of Ser. No. 219,038 filed Jan. 19, 1972, now U.S. Pat. No. 3,794,264.

BACKGROUND AND SUMMARY OF THE INVENTION

Closed face fishing reels are well known to the art and have been manufactured in large quantities at comparatively low cost for many years in a variety of embodiments. Representative of the earlier reels and the well developed and rather crowded state of the art are many U.S. patents issued to R. D. Hull, including among many others U.S. Pat. Nos. 2,541,360; 2,668,025; 2,675,193; 2,964,257; 3,020,666; 3,059,873; 3,088,691; 3,185,405; 3,469,799; 3,481,554; and 3,552,674.

All closed face spinning reels of the type contemplated herein include a line spool from which fishing line is paid out and retrieved by an appropriate pickup, which is rotated by a crank mechanism geared thereto; a drag brake mechanism to permit a payout of line when an undue pressure is exerted thereon by a hooked fish; an anti-reverse mechanism to prevent the rotation of the crank handle in the payout direction; and a closed face housing completely enveloping the reel mechanism and including a thumb button for preparing the internal mechanism for casting.

The aforementioned basic components have taken a variety of shapes, forms and structures in the reels of the prior art. However, there are certain improvements therein in the nature of simplification of parts and arrangements which, advantageously, lead to a reduction in manufacturing expense and a simplification of assembly and use of a closed face spinning reel. For a more complete understanding of the reel of the present invention and a greater appreciation of its attendant advantages derived from its specific structural features, reference should be made to the following detailed description of the new closed face reel, taken in conjunction with the accompanying drawings, which are illustrative of a preferred embodiment of the new reel of the present invention.

DESCRIPTION OF THE DRAWINGS

FIG. 1 is a cross-sectional view of the new reel of the invention, showing details of construction thereof;

FIG. 2 is an enlarged, fragmentary, cross-sectional view taken along line 2—2 of FIG. 1, showing details of construction of a new bayonet mount for the line spool of the reel;

FIG. 3 is an enlarged, fragmentary, cross-sectional view taken along line 3—3 of FIG. 1, showing details of construction of the thumb button disposed in the rear cover of the new reel;

FIG. 4 is an enlarged, fragmentary, cross-sectional view of the reel, taken along line 4—4 of FIG. 1 and showing details of construction of the simplified, new drag brake mechanism;

FIG. 5 is an enlarged, fragmentary, cross-sectional view of a stud in the spinner head, which includes a mechanism for locking the spinner in a casting position;

FIG. 6 is an enlarged, cross-sectional view taken along line 6—6 of FIG. 1, showing a new spring lock for holding the spinner head in the casting position;

FIG. 7 is a cross-sectional view taken along line 7—7 of FIG. 5, showing the manner in which the spring lock is cammed from locked to unlocked positions;

FIG. 8 is an enlarged, cross-sectional view taken along line 8—8 of FIG. 4, showing a ratchet and pawl anti-reverse mechanism accommodating retrieval rotation of the line crankshaft;

FIG. 9 is a cross-sectional view taken along line 9—9 of FIG. 4, showing the ratchet and pawl mechanism of FIG. 8, prohibiting crankshaft rotation in the line pay out direction.

DESCRIPTION OF PREFERRED EMBODIMENT

Figure 10:
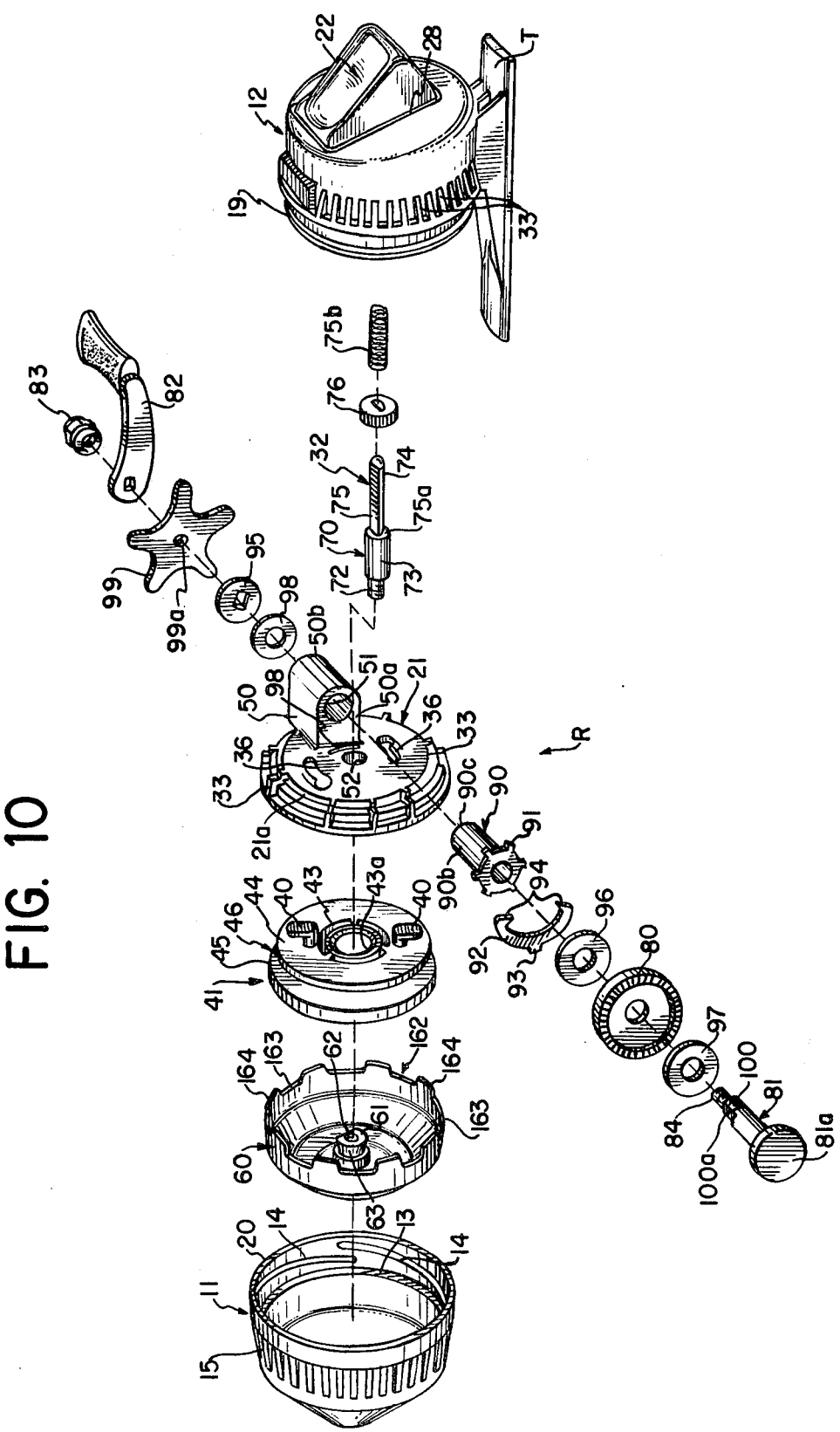
FIG. 10 is an exploded, perspective view of the components of the new closed face spinning reel, showing the manner in which they are assembled.

Referring first to FIGS. 1 and 10, there is shown a reel including a closed face housing 10, including a front cup-shaped cover 11 and a rear cup-shaped cover 12, both of which are molded from high impact strength plastic. The generally annular rearward flange portions of the front cover 11 include a locking shoulder 13 and helical threads 14 formed on the internal surfaces thereof and knurled gripping portions 15 formed on the external surfaces thereof. The conical front end of the cover 11 includes a circular line opening which mounts an annular line guide 16 in a known manner, as shown. The rear cover 12 includes at its forwardly facing end, outer and inner shoulders 17, 18, respectively, and a helical thread 19 which is adapted to engage the threads 14 when the front and rear covers are rotatably, telescopically assembled, as will be understood. More specifically, the outer shoulder 17 is adapted to abut the peripheral edge 20 of the front cover 11, while the shoulder 18 is adapted to engage the rear surface 21a of a generally circular mounting plate 21, and to clamp the front surface 21b thereof against the shoulder 13 in the front cover. The rear cover 12 also includes an integrally molded tang T, which is adapted to mount the entire closed face fishing reel to a reel seat on a fishing rod in a known manner.

In accordance with one specific aspect of the present invention, the rear cover 12 at the uppermost rear portions thereof includes unique integral structure for mounting a new, pivotable, one-piece thumb button 22. More specifically, and as shown best in FIG. 3, the integral mounting for the thumb button 22 includes a pair of spaced pivot members 23, each of which defines an open C-shaped, resilient pivot slot 24, in which slots small cylindrical pivoting axles 25 of the thumb button 22 may be appropriately snapped into place. As an important aspect of the new thumb button mounting, the rear cover 12 also includes an integral, rectangular stop bar 26 which is disposed between the two pivots 23, and which cooperates with the thumb button 22 to prevent its dislodging or separation from the rear cover. In addition, the bar 26 limits the rearward displacement of the thumb button 22, with respect to the cover 12.

As shown in FIG. 1, the thumb button 22 includes, in addition to the pivot axles 25, a downwardly depending flange 26, which is adapted to engage the lower wall surface 27 of a thumb button opening 28 formed in the rear wall of the rear cover 12, and an upper horizontal abutment surface 29, which is adapted to engage the stop member 26 of the rear cover. As a very important aspect of the present invention, the thumb button 22 may be assembled to and disassembled from the cover 12 only when the thumb button has been pivoted into a relationhip in which the upper edge 29 of the button is disposed beneath the locking or blocking bar 26. This relationship may be effected when the edge 29 is generally parallel with the horizontal axis of the reel. In this manner, it is simple for the thumb button and rear cover to be assembled into a two-piece subassembly which will virtually never become disassembled in the normal course of use and handling.

Thus it will be appreciated that the entire thumb button and rear cover assembly may be fabricated from only two elements, each of which advantageously may be manufactured from high impact strength injection molded plastic, the same material from which the front cover 11 and most of the other components of the new reel are adapted to be manufactured. Indeed, the entire housing comprises only four separate parts, two covers, a button, and a line guide. Specifically and as shown, the thumb button 22 is generally hollow, although it includes a central wall member 30, having a concave portion 31 adapted to engage the rearward end of central main shaft 32 in a manner common to closed face fishing reels of this general type. Advantageously, the rear cover 12 is also provided with knurls 33 to facilitate gripping thereof in the threaded assembly of the front cover 11 to the rear cover 12.

The circular plate 21 is adapted to be clamped between the front and rear covers 11 and 12, in the manner described hereinabove, and is adapted to support the remainder of the reel structure thereon, including the main shaft 70, the crankshaft 81, the spinner head 60, and the line spool 41.

The periphery of plate 21 includes a plurality of axially extending ribs 32, the length of which in the axial direction of the reel is equal to the spacing between the shoulders 13 and 18 on the front and rear covers, when the front and rear covers are threadedly connected and tightened down in a manner whereby the rear edge of the front cover is seated against the flange 17 of the rear cover. Advantageously, the rearwardly facing surfaces of the circular plate 21 are stepped and ribbed, as shown in FIG. 10, to reduce the weight and increase the strength of the plate 21, which is advantageously formed of injection molded plastic. In accordance with another specific aspect of the invention, the plate 21 includes a pair of arcuate bayonet slots 36. The slots are best shown in FIG. 2 and have enlarged opening portions 37 which are connected to narrow, throatlike portions 38 having an integral key 39 formed therein. The bayonet slots 36 are adapted to receive mating bayonet fasteners 40, formed integrally on the rear surface of a one-piece injection molded line spool 41.

The plate 21 also includes a rearwardly projecting boss 50 having a transverse opening therethrough for receiving the crankshaft 81. In addition, the plate 21 has a hub 53 with opening 52 formed therein which is adapted to support the main shaft 70 of the reel for rotation and selective axial displacement therein. Concentric with the opening 52 and projecting forwardly from the plate 21 is the circular hub 53 upon which the line spool 41 is adapted to be mounted. At the upper periphery of the plate 21 a forwardly opening angular slot 54 is included, which slot is adapted to receive the rearwardmost notched portions 62 of the spinner head 60, as will be explained in more detail hereinafter.

In accordance with another important aspect of the present invention, a new and improved line spool construction is provided. The new spool 41 is comprised of a single injection molded plastic component which carries a molded-in locking spring 47 thereon. As shown in FIGS. 1 and 10, the spool 41 includes a cenral hub portion 43 having a bore 43a therethrough, a rear wall 44, and a front wall 45. Fishing line L is wound about hub 43 between walls 44, 45 in a line-receiving space 46. The spool 41 is fixedly, non-rotatably mounted directly to the support plate 21 by insertion of the bayonet mounts 40 in the bayonet slots 36 and subsequent twisting of the spool 41, relative to the plate 21, to lock the spool 41 securely to the plate 21, as will be understood. In the illustrated embodiment, the spool is locked to the plate by a counterclockwise motion and unlocked by a clockwise motion, as viewed from the front of the reel.

More specifically, and as an important feature of the new reel, a single wire lock spring 47 is carried by the spool adjacent its front face, as shown in FIGS. 1 and 5. The spring may be deposited in the mold in which the line spool is formed for permanent attachment thereto. To that end, the spring 47 has a circular end 48, which may be disposed in a corresponding opening formed in the mold for the line spool in order to be "molded into" the spool by plastic 47a (FIG. 6). As shown, the forwardmost portions of the hub 43 are removed to define a C-shaped portion 43b having lands 43c in order to accommodate the intersection of the bore 43a by the distal end of the spring 47. As shown in FIG. 6, the circular end 48 of the spring is molded directly into and secured by the portions 47a of the plastic forming the one-piece spool body 41. Thus, the spring 47 is a permanent, inseparable, and important part of the spool. Specifically, the spring 47 serves to lock the spinner head in a forward casting position upon depression of the thumb button 22 and to release the spinner head for rearward axial displacement upon the rotation of the line crank in the retrieval direction. To that end, the spinner head 60 includes a special camming stud member 61, which includes a lowermost locking surface 62, separated from a conical camming surface 63 by a locking shoulder 64 and an uppermost surface 65 separated from the camming surface 63 by a shoulder 66.

More specifically, the spinner head 60 of the present invention includes a generally "square-scalloped", cylindrical flange 162 having peaks 164 and troughs 163 for engaging paid out line, to retrieve the same. The rearwardly extending peripheral flange 162 projects over the periphery of the rim of the front wall 41 of the line spool to a point where the peaks 164 are received within the annular groove 54 in the plate 21. The trough portions 163 of the edge 162 do not enter the groove 54; accordingly, the fishing line L will be trapped in a closed, rotating opening defined by the three edges (generally U-shaped) of a trough 163 and the front edges 54a of the angular groove 54. This general line trapping arrangement is shown in greater detail in U.S. Pat. No. 3,259,333.

As shown in FIG. 1, the stud 61 is staked or otherwise securely fastened to a central opening 60a in the spinner head 60. For the purposes of securely fastening the spinner head 60 to the forward threaded end 72 of the main shaft 70 of the reel, the stud 61 includes internal threads 71 which mate with the threaded end 72. The main shaft 70, as shown in FIG. 10, includes an enlarged diameter portion 73 and a reduced diameter portion 74 having a flat 75 formed thereon. As is conventional in reels of this type, the main shaft 70 is adapted to be rotated through a crank mechanism by means of a spur gear 76, which is non-rotatably, slidingly keyed to the flat 75. In this regard, the shaft 70 is adapted to be axially displaced forwardly and rearwardly of the reel, in order to move the spinner head 60 between casting position and retrieval position, respectively.

Rotation of the spinner head 60 is effected through a bevel gear 80 which cooperates with the aforementioned spur gear 76. As shown best in FIGS. 4 and 10, the bevel gear 80 is mounted for rotation on a crankshaft 81, which is driven or rotated by a crank lever 82, secured to the other end of the shaft 81 by means of a lock nut 83 threaded to a corresponding threaded portion 84 of the shaft 81. The shaft 81 is supported for rotation in the radial bore 51 formed in the integral boss 50 of the support plate 21. The boss has inner and outer faces 50a, 50b, as shown.

In accordance with a further specific aspect of the invention, a unique anti-reverse mechanism and new drag brake mechanism for the new reel are associated with the rotatable crank assembly. More specifically, the anti-reverse mechanism includes a rotatable ratchet 90 having ratchet teeth 91 formed thereon and a pivotable pawl 92, having a stop tab 93 and pawl teeth 94 formed thereon. The ratchet 90 is directly keyed to the crankshaft by an appropriate key opening 90a formed in the rear wall of 90b in an integral extension 90c for rotation therewith. The opening 90a corresponds in shape to the cross section of shaft 81 at 100a. The tab 93 projects into a slot 98 formed in the plate 21 and, as will be understood, has its displacement limited by the edges 98a, 98b of the slot 98.

The drag brake for the present reel is in the nature of a selectively controllable slippage which is effected between the bevel gear 80 and the spur gear 76. That is to say, an excessive load normally placed upon the spinner head 60 would tend to rotate the same in a line payout direction, however, the spur gear 76 would normally tend to be locked and to oppose such rotation by its meshing engagement with the bevel gear 80. However, in accordance with the invention, a predetermined amount of rotating slippage of the bevel gear relative to the shaft upon which it is mounted may be had due to the unique manner in which the bevel gear is secured to the crankshaft 81. The bevel gear is secured to the shaft 81 for rotation therewith by a spring clutch type of arrangement, including a disc clutch spring 95 and star wheel 99, which urge the shaft 81 outward. Washers 96 and 97 tend to clamp the bevel gear on the chrankshaft 81 between the head 81a of the shaft and the ratchet wheel 90. The degree of pressure applied by the disc spring 95 may be selectively controlled by rotation of a star wheel 99, threadedly mounted adjacent the crank to the crankshaft 81 at threaded portion 100, to control the slippage of the bevel gear relative to the shaft 81 and hence to control the degree of "drag".

Operation and assembly of the new reel is as follows: A reel subassembly R comprising all of the elements of the reel, with the exception of the front and rear covers 11, 12 and the thumb button 22, is established from all of the parts shown in the exploded view of FIG. 10. More specifically, the spool 41 is quickly and simply attached to the circular plate 21 merely by inserting the bayonet fasteners or cleats 40 through the mating bayonet slots 36 in the plate 21 and giving the spool a slight clockwise turn (as viewed from the front face of the reel) to seat the heads 40a of the fasteners against the wall portion 39, the thickness of which advantageously is tapered, as shown, to facilitate attachment and removal. It should be noted that the spool 41 comprises a single injection molded plastic element (with the molded-in spring 47) and may be manufactured at such a low cost as to be a readily "disposable" component of the reel. Thus, the reel may be provided with, or a fisherman may choose to utilize, a plurality of spools 41, each one of which has a different weight or type line wound thereon. The spools 41 may, of course, be removed from the plate by a simple counterclockwise twist.

The crankshaft 81 and its associated elements may be assembled into the subassembly R by inserting the crankshaft 81 with its associated elements, shown along the radial axis of FIG. 10, through the bore 51 of the boss 50. In this manner, the bevel gear 80 will be supported between washers 96, 97 on the shaft 81, and the anti-reverse pawl 92 will be supported between the washer 96 and the face of the ratchet element 90 in a cooperative relationship therewith, as shown best in FIG. 4. On the opposite side of the boss 50, the star wheel 99 and the washer 98 will sandwich the clutch spring 95 while the star wheel itself, by virtue of its threaded bore 99a, will be threaded on to threads 100 at the end of the shaft 81. The crank 82 is secured on end 84 by a cap nut 83. As shown, the crank 82 and the clutch spring 95 have elongated slots thereon which cooperate with the flat 100a, machined on the crankshaft 81 to key those elements non-rotatably to the crankshaft in a known manner.

The main shaft 32 is assembled with portion 70 in the bore 52 and with the spur gear 76 slidingly supported on the flat 75 and urged against the shoulder 75a by a coil spring 75b, the rearward end of which is reduced in diameter to engage an angular shoulder 75c formed at the rearward end of the shaft, as shown best in FIG. 1. The spinner head 60 is attached to the forward end of the main shaft by threading the stud 61 onto the threads 72. Advantageously, the thickness and diameter of the head 81a of the crankshaft prevent the spur gear and main shaft 32 from becoming detached from the reel subassembly R should the shaft 32 be rearwardly displaced with the spinner head removed.

The subassembly R, comprising all of the reel mechanism carried on the mounting plate 21, as heretofore described, is then inserted bodily into the housing comprised of the covers 11, 12. Ordinarily, the subassembly will be inserted into the open end of rear cover 12, the boss 50 being slipped through an elongated opening (of shape similar to the boss cross section) in the wall of the rear cover. The forward end of line L is passed through the line guide 16 in the front cover 11, which cover is then threaded onto the rear cover 12 to clamp the plate 21 of the sub-assembly R tightly in the housing and to complete the reel assembly. When the covers and the plate 21 have thus been assembled, the inner end 31 of the thumb button will rest against the rearward end of the main shaft 32, urged rearwardly by spring 75b, in position to be actuated in the casting and retrieving operations of the reel.

In the operation of the reel by a fisherman, the line L is held against premature release during the initial stages of the casting. This is accomplished by gripping or braking the line between the front surface of the spinner head 60 and the inner wall of the conical portion of the front cover 11, in well known manner, by moving the spinner head forwardly of the reel by depressing the thumb button 22. As should be understood, when the spinner head 60 is moved forwardly, the line L will be pinched between the conical wall of cover 11 and the front surface of the spinner head. At any other position of the spinner head, the line is free to move to and from the spool 41 for casting and retrieval.

In the initial stages of casting, in which pressure will have been applied to the thumb button 22 to move the latter inwardly of the housing, the forward end of the integral button wall 30 will have urged main shaft 32 forwardly to move the spinner head 60 forwardly until the line is braked against outward movement. Thus the line and the lure attached thereto may be held against outward movement while the casting movement of the rod is begun. Thumb pressure is then relieved from the thumb button, and the main spring 75b will act to move shaft 32 rearwardly to draw the spinner head 60 rearwardly, thereby freeing the line for outward movement. The cast may then be made, this occurring contemporaneously with the release of thumb pressure on the button 22. When the spinner head is moved forwardly, as previously noted, the stud 61 will also be moved out in front of the end of the hub 43, as seen in FIG. 5. When the pressure on the thumb button is relaxed, to release the line, the locking spring 47 will be positioned radially inwardly of the periphery of the locking shoulder 64 (FIGS. 1, 5 and 6), with the result that the spring 47 will engage the forward face of the shoulder 64 and prevent the spinner head 60 from returning to its rearmost position, thereby holding the notched edge 162 of the flange ahead of the front wall 45 of the line spool 41. In this position, the notches 163 are held out of the path of movement of the line L, which will be flowing over the flange of the spinner head as the cast is being made.

When the cast has been completed, it is necessary for the spinner head to be retracted to its rearmost position, as shown in FIG. 1, in order to retrieve the line. It is necessary, therefore, to remove the spring 47 from its engagement with the shoulder 64, in order to allow this further rearward movement of the spinner head. This additional retraction is effected upon the initial rotation of the spinner head in the retrieval direction by the provision of camming surfaces 62, 63 arranged on the stud 61. This camming action is illustrated in FIGS. 5, 6 and 7.

As is conventional in reels of this type, line L is retrieved by rotation of the crankshaft 81 through the crank 82 to rotate the main shaft 32. As disclosed hereinabove, the rotation of the main shaft will cam the spring 47 into a release position to allow the retraction of the spinner head 60 and engagement of the line in one of the pickup notches 163. Free rotation of the crankshaft in the line retrieval direction is accommodated by the ratchet wheel 90 and pawl 92 (FIG. 8), however, crank rotation in the reverse direction (payout) is prohibited by the engagement of pawl 94 and teeth 91 (FIG. 9). Nevertheless and in accordance with the invention, limited line payout by a hooked fish, for example, is accommodated by adjusting the slippage between the meshing spur gear 76 and bevel gear 80, by controlling the slippage or rotatability of the bevel gear 80 upon shaft 81. This is directly controlled by varying the pressure applied by the clutch spring 95 through selective tightening of the star wheel 99, as should be understood. The greater the pressure (flattening) of the spring 95 and the attendant increased clamping of the gear 80 against the head 81a, the less the slippage or drag, and vice versa.

From the foregoing, it will be seen that the present invention provides a compact, simply constructed spinning reel of the closed face type, which may be quickly and easily assembled and disassembled, which is substantially foolproof in operation, particularly in assuring absence of backlash and a positive anti-reverse mechanism and drag brake.

The reel construction herein described lends itself particularly to the employment of plastic materials for the construction not only of the housing covers 11, 12, but also of the plate 21, the spool 41, and many other parts of the subassembly R, thereby greatly reducing both the cost of fabrication and the cost of material, as well as providing a lighter assembly, which is also highly resistant to salt water corrosion, and other deleterious conditions commonly encountered in the use of fishing reels.

It will be understood that various alterations, modifications and changes may be made in the details of the illustrative embodiment within the scope of the appended claims, but without departing from the spirit of this invention.

I claim:

1. A housing and mounting plate assembly for a closed face spinning reel including
   (a) a generally cup-shaped front cover means having an annular rearwardly extending flange and a generally conical front wall,
   (b) a line guide opening formed in the center of said conical wall,
   (c) a first helical thread means integrally formed on the inner surface of said annular rearwardly projecting flange adjacent the edge thereof,
   (d) a first shoulder means formed on the inner surface of said flange forwardly of said first thread means,
   (e) a generally cup-shaped rear cover means having an annular forwardly extending flange of outer diameter less than the inner diameter of said rearwardly extending flange and a rear wall,
   (f) a second thread means formed on the external surface of said forwardly extending flange adjacent the edge thereof; said first and second thread means being adapted to be lockingly engaged when said front cover flange is telescoped and rotated with respect to said rear cover flange,
   (g) a second shoulder formed on an external surface of said rear cover and being adapted to form an abutment and frictional holding surface for the peripheral edge of said front cover,
   (h) a third shoulder formed on an inner surface of said rear cover flange,
   (i) a generally circular mounting plate,
   (j) said third shoulder being adapted with said first shoulder to clamp said mounting plate therebetween when said front and rear covers are threadedly engaged,
   (k) said rear wall defining a generally rectangular thumb button opening therein,
   (l) a thumb button being disposed in said opening,
   (m) the inner surfaces of said rear wall above said opening including integral means mounting said button for pivotal movement with respect to said rear wall,
   (n) said thumb button including a pair of integral cylindrical pivot axles,
   (o) said integral mounting means for said thumb button including a pair of spaced pivot members, each of which defines an open C-shaped, resilient pivot slot,
   (p) said cylindrical pivoting axles being supported in said slots, (q) an integral stop bar means is disposed on said rear cover between the two pivot members for cooperation with said thumb button to prevent its dislodging or separation from said rear cover in normal operating positions of said thumb button, while enabling dislodgement of said thumb button when the latter is pivoted forwardly to a non-operative position, and (r) means carried by said mounting plate and operative when said plate is clamped by said front and rear cover means for limiting pivoting movement of said thumb button to its range of operative positions.

2. The housing of claim 1, in which
(a) said thumb button includes a downwardly depending flange which is adapted to engage the lower wall surface of said thumb button opening formed in said rear wall;
(b) said thumb button includes an upper horizontal abutment surface which is adapted to engage said stop bar means of said rear cover;
(c) whereby said thumb button may be assembled to and disassembled from said rear cover only when said thumb button has been pivoted into a relationship in which the upper horizontal edges of the button are disposed beneath said stop bar means.

3. A housing in accordance with claim 1, in which
(a) a longitudinally disposed main shaft carried by said mounting plate, and
(b) said button is generally hollow and includes a central rigidifying wall having a portion adapted to engage said main shaft.

* * * * *